(12) United States Patent
Sekine et al.

(10) Patent No.: US 8,628,425 B2
(45) Date of Patent: Jan. 14, 2014

(54) TORQUE FLUCTUATION ABSORBER

(75) Inventors: Tsutomu Sekine, Kariya (JP); Masaru Ebata, Chita (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 0 days.

(21) Appl. No.: 13/420,235

(22) Filed: Mar. 14, 2012

(65) Prior Publication Data

US 2012/0234642 A1 Sep. 20, 2012

(30) Foreign Application Priority Data

Mar. 15, 2011 (JP) ................................. 2011-056969

(51) Int. Cl.
*F16D 7/02* (2006.01)

(52) U.S. Cl.
USPC .......................................... 464/46; 464/68.41

(58) Field of Classification Search
USPC .................. 464/46, 68.4, 68.41; 192/213.11, 192/213.12, 213.21, 213.22, 213.3, 213.31, 192/214, 214.1
See application file for complete search history.

(56) References Cited

U.S. PATENT DOCUMENTS

2009/0294239 A1  12/2009  Nakagaito et al.
2010/0032259 A1*  2/2010  Saeki et al.

FOREIGN PATENT DOCUMENTS

JP      2009-293652 A     12/2009

* cited by examiner

*Primary Examiner* — Gregory Binda
(74) *Attorney, Agent, or Firm* — Buchanan Ingersoll & Rooney PC

(57) ABSTRACT

A torque fluctuation absorber includes a damper portion absorbing a torque fluctuation between the output shaft and the input shaft with an elasticity thereof, and a limiter portion arranged on the power transmission path from the damper portion to the input shaft, configured to slip when the torque fluctuation by a torsion between the output shaft and the input shaft equals or exceeds a predetermined torque defined to absorb at the damper portion. The damper portion includes a center plate transmitting a rotational power to the limiter portion, side plates receiving the input of the rotational power from the output shaft, an elastic member absorbing the torque fluctuation caused by the torsion between the center plate and the side plates. The side plates directly or indirectly connect to a flywheel that connects to the output shaft at a circumferential portion outward in a radial direction relative to the damper portion.

13 Claims, 5 Drawing Sheets

FIG. 5

TORQUE FLUCTUATION ABSORBER

CROSS REFERENCE TO RELATED APPLICATIONS

This application is based on and claims priority under 36 §119 to Japanese Patent Application 2011-056969, filed on Mar. 15, 2011, the entire content of which is incorporated herein by references.

TECHNICAL FIELD

This disclosure generally relates to a torque fluctuation absorber.

BACKGROUND DISCUSSION

A torque fluctuation absorber is a device arranged on a power transmission path from an engine to a transmission for absorbing, or reducing, a torque fluctuation between the engine and the transmission. A known torque fluctuation absorber includes a damper portion for absorbing the torque fluctuation with a spring force, hysteresis portion for absorbing, or reducing, the torque fluctuation with a hysteresis torque caused by a friction, and a limiter portion configured to slip when the torque fluctuation caused by a torsion between rotating shafts exceeds the amounts absorbable at the damper portion and the hysteresis portion. According to a known torque fluctuation absorber disclosed in JP2009-293652A, the damper portion is arranged on the power transmission path at a position closer to the engine and the limiter portion is arranged on the power transmission path at a position closer to the transmission, in order to make an inertia at a portion before reaching a spring of the damper portion to be low and the inertia at a portion alter the spring to be high, for defining a damping performance of the damper portion.

A structure for improving a distribution balance of the inertias between the portions before and after the spring of the damper portion is complex with the known torque fluctuation absorber due to having plate members with intricacies in, for example, shapes and placements. The known torque fluctuation absorber includes bolts, or connecting members, for connecting the torque fluctuation absorber and the engine member, disposed on the power transmission path closer to the engine at a position inward in a radial direction of the damper portion. As a result, through-holes are provided to multiple plate members for penetrating the bolts, causing the structure to become complex.

A need thus exists for a torque fluctuation absorber, which is not susceptible to the drawback mentioned above.

SUMMARY

In light of the foregoing, the disclosure provides a torque fluctuation absorber including a damper portion arranged on a power transmission path from an output shaft of a power source to an input shaft of a transmission, absorbing a torque fluctuation between the output shaft and the input shaft with an elasticity thereof, and a limiter portion arranged on the power transmission path from the damper portion to the input shaft, configured to slip when the torque fluctuation caused by a torsion between the output shaft and the input shaft equals or exceeds a predetermined torque defined to absorb at the damper portion. The damper portion includes a center plate in annular form transmitting a rotational power to the limiter portion, side plates, each in an annular form, arranged at each opposite side of the center plate in an axial direction with a displacement, receiving the input of the rotational power from the output shaft, an elastic member absorbing the torque fluctuation caused by the torsion between the center plate and the side plates. The side plates directly or indirectly connect to a flywheel that connects to the output shaft at a circumferential portion outward in a radial direction with respect to the damper portion.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Embodiments of a torque fluctuation absorber 1 disclosed mere includes a damper portion 2 (shown in FIG. 1 and FIGS. 3 to 5 with a reference numeral 2) arranged an a power transmission path from a crankshaft 5, serving as the output shaft (shown in FIG. 1 and FIGS. 3 to 5 with a reference numeral 5), of a power source to an input shaft 30 (shown in FIG. 1 and FIGS. 3 to 5 with a reference numeral 30) of a transmission for absorbing a torque fluctuation between the crankshaft 5, serving as an output shaft, and the input shaft 30 with an elasticity thereof, a limiter portion 4 (shown in FIG. 1 and FIGS. 3 to 5 with a reference numeral 4) arranged on a power transmission path from the damper portion 2 to the input shaft 30 configured to slip when the torque fluctuation caused by a torsion between the crankshaft 5, serving as an output shaft, and the input shaft 30 equals or exceeds a predetermined torque defined to absorb at the damper portion 2. The damper portion 2 includes a center plate 15 (shown in FIG. 9 and FIGS. 3 to 5 with a reference numeral 15) in annular farm transmitting a rotational power to the limiter portion (4), side plates 11, 12 (shown in FIG. 1 and FIGS. 3 to 5 with reference numerals 11, 12), each in annular form, arranged at each opposite side of the center plate 15 in an axial direction with a displacement, receiving the input of the rotational power from the crankshaft 5, serving as an output shaft, and a coil spring 16, serving as an elastic member (shown in FIG. 1 and FIGS. 3 to 5 with a reference numeral 16) absorbing the torque fluctuation caused by a torsion between the center plate 15 and the side plates 11, 12. The side plates 11, 12 directly or indirectly connect to a flywheel 7 (shown in FIG. 1 and FIGS. 3 to 5 with a reference numeral 7) connected to the crankshaft 5, serving as an output shaft, at a circumferential portion outward in a radial direction with respect to the damper portion 2.

The reference numerals that refer to drawings are indicated to help understand the descriptions of the embodiments and do not limit the embodiments to the embodiments referred to with the reference numerals.

Figure 1:
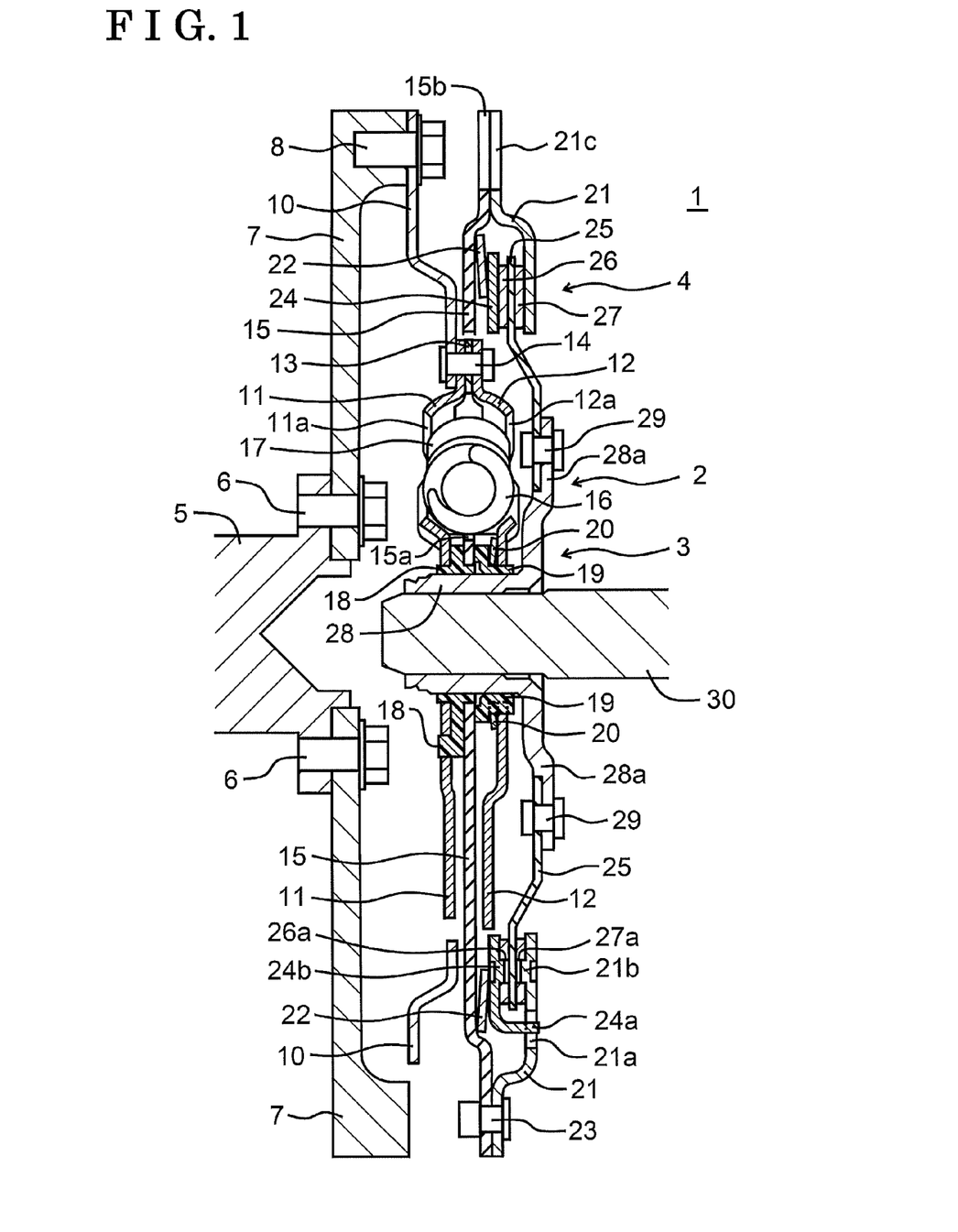
FIG. 1 is a cross-sectional view illustrating a configuration of a torque fluctuation absorber according to a first embodiment.
Figure 2:
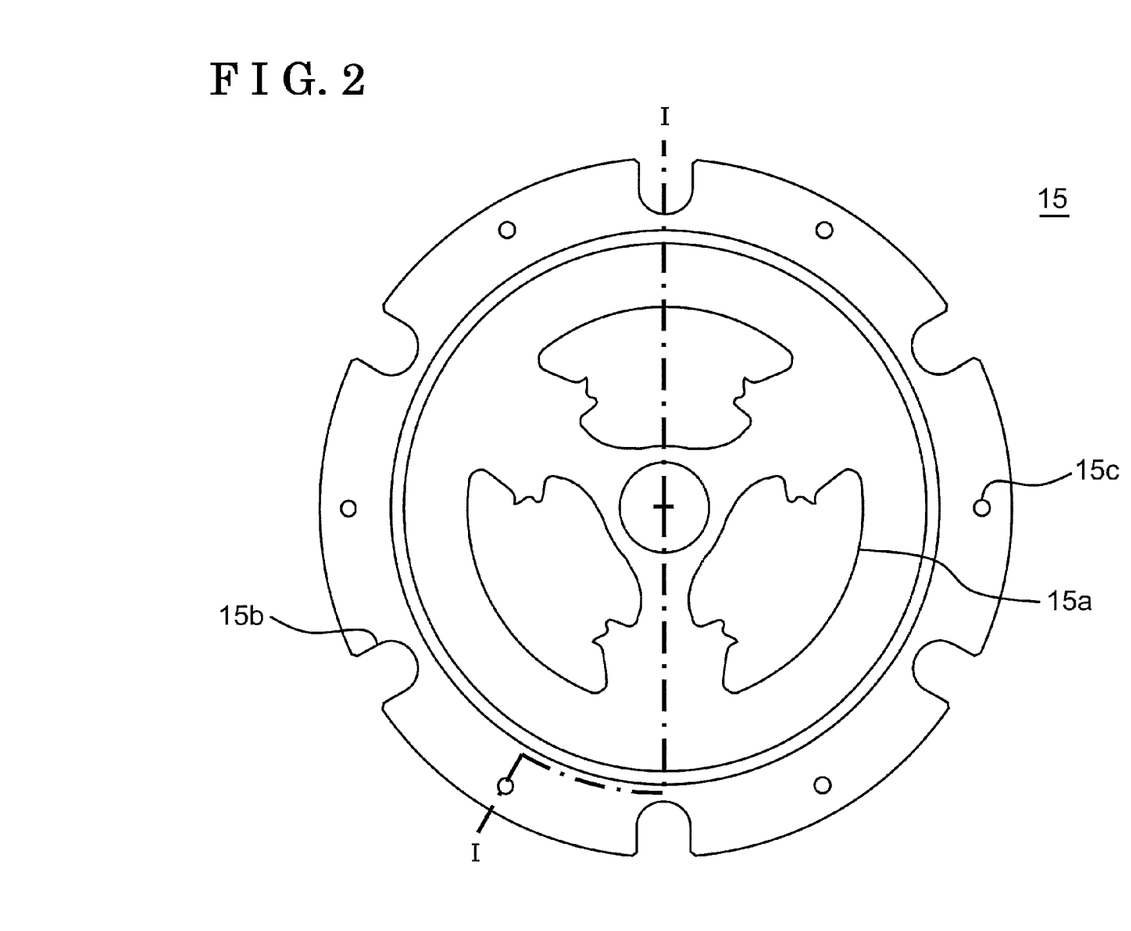
FIG. 2 is a plan view illustrating a typical configuration of a center plate of the torque fluctuation absorber according to the first embodiment.

A first embodiment of the torque fluctuation absorber 1 will be described as follows referring to the drawings. FIG. 1 is a cross-sectional view illustrating a configuration of the torque fluctuation absorber 1 according to the first embodiment. FIG. 2 is a plan view illustrating a typical configuration of the center plate 15 of the torque fluctuation absorber 1 according to the first embodiment.

The torque fluctuation absorber 1 according to the first embodiment is a device arranged on the power transmission path from the crankshaft 5 (output shaft 5) of the power source, for example an engine or a motor, to the input shaft 30 of the transmission for absorbing, or reducing, the torque fluctuation caused by the torsion between the rotating shafts, for example between the crankshaft 5 and the input shaft 30. The torque fluctuation absorber 1 includes the damper portion 2 having a feature for absorbing a torsional impact for absorbing the torque fluctuation between the rotating shafts by a spring force, a hysteresis portion 3 for absorbing, or reducing, the torque fluctuation between the rotating shafts with a hysteresis torque caused by a friction, and the limiter portion 4 configured to slip when the torque fluctuation caused by a torsion between rotating shafts equals or exceeds the predetermined amounts absorbable at the damper portion 2 and the hysteresis portion 3. The damper portion 2 is arranged in a parallel position on the ponder transmission path relative to the hysteresis portion 3. The limiter portion 4 is arranged in a serial position on the transmission path relative to the damper portion 2 and the hysteresis portion 3. The damper portion 2 and the hysteresis portion 3 are arranged on the power transmission path from the crankshaft 5 of the engine to the limiter portion 4. The limiter portion 4 is arranged on the power transmission path from the damper portion 2 and the hysteresis portion 3 to the input shaft 30 or the transmission. Upon the arrangements described herewith, the inertia of the power transmission path between the darn per portion 2 and the input shaft 30 of the transmission may be increased and an improvement of a distribution balance of the inertias between the portions before and after the spring of the damper portion becomes easier.

The torque fluctuation absorber 1 includes, a plate 10, serving as a connection plate, a first side plate 11 and a second side plate 12, together serving as the side plates 11, 12, spacers 13, a first set of rivets 14, the center plate 15, the coil springs 16, seating members 17, a first thrust member 18, a second thrust member 19, a first coned disc spring 20, a cover plate 21, a second coned disc spring 22, second set of rivets 23, a pressure plate 24, a lining plate 25, first friction materials 26 and second frictional materials 27, a hub member 26, and third set of rivets 29 as component members.

The plate 10 is an annular member for transmitting the rotational power from the flywheel 7 to the damper portion 2 and die hysteresis portion 3. The plate 10 connects (or attaches and is fixed) to the flywheel 7 at the outer periphery portion with first set of bolts 8. The flywheel 7 connects to the crankshaft 5 of the engine by second set of bolts 6. An inner periphery portion of the plate 10 is formed to define a clearance between the flywheel 7 and is in contact with the first side plate 11 at a surface facing the flywheel. The first set of rivets 14 connects the plate 10, the first side plate 11, the spacers 13 and the second side plate 12 together thereat. As a result, the plate 10 rotates together with the crankshaft 5, the flywheel 7, the first site plate 11, the second side plate 12, and the spacers 13 as one unit.

The first side plate 11 is an annular member composing the damper portion 2 and the hysteresis portion 3, which is disposed to a position closer to the engine relative to the center plate 15, which is to a left in FIG. 1, A portion near an outer circumferential end of the first side plate 11 is disposed between the plate 10, and the spacers 13. The first set of rivets 14 connects the first side plate 11, the plate 10, the spacers 13 and the second side plate together thereat. As a result, the first side plate 11 rotates together with the crankshaft 5, the flywheel 7, the plate 10, the second side plate 12, and the spacers 13 as one unit. The first side plate 11 includes opening portions 11a for containing the coil springs 16 and the seating members 17 of the damper portion 2 arranged in a middle portion thereof. End surfaces in the circumferential direction of each opening portion 11a selectively contact the seating member 17 corresponding to each end surface. The first side plate 11 engaged with the first thrust member 15 is non-turnable and movably supported in the axial direction with respect to the first thrust member 18 at the hysteresis portion 3, which is arranged at a circumferentially inward position relative to the damper portion 2. An inner circumferential end portion of the first side plate 11 is rotationally supported to the hub member 28 via the first thrust member 18.

The second side plate 12 is an annular member composing the damper portion 2 and the hysteresis portion 3, which is disposed to a position closer to the transmission relative to the center plate 15, which is to a right in FIG. 1. A portion near an outer circumferential end of the second side plate 12 is disposed to a position closer to the transmission relative to the spacer 13, which is to a right in FIG. 1. The first set of rivets 14 connects the second side plate 12, the plate 10, the first side plate 11, and the spacers 13 together thereat. As a result, the second side plate 12 rotates together with the crankshaft 5, the flywheel 7, the plate 10, the first side plate 11, and the spacers 13 as one unit. The second side plate 12 includes opening portions 12a for containing the coil springs 16 and the seating members 17 at the damper portion 2 arranged in a middle portion thereof. End surfaces in the circumferential direction of each opening portion 12a selectively contact the seating member 17 corresponding to each end surface. The second side plate 12 engaged with the second thrust member 19 is non-turnable and is movably supported in the axial direction with respect to the second thrust member 19, and supports the first coned disc spring 20 at the hysteresis portion 3, which is arranged at a circumferentially inward position relative to the damper portion 2. An inner circumferential end portion of the second side plate 12 is rotationally supported to the hub member 28 via the second thrust member 19.

The spacers 13 are plate farm members for separating outer periphery portions of the side plates 11, 12. The spacers 13 are sandwiched between the outer periphery portions of the side plates 11, 12 at positions outward in the radial direction relative to the damper portions 2 of opening portions 15a of the center plate 15, and the first set of rivets 14 connects the spacers 13, the plate 10, and the side plates 11, 12 together thereat. As a result, the spacers 13 rotate together with the crankshaft 5, the flywheel 7, the plate 10, the first side plate 11, and the second side plate 12 as one unit. Each of the spacers 13 is disposed for each of the opening portions 15a of the center plate 15. As a result, for the center plate 15 with the opening portions 15a arranged at three positions, as illustrated in FIG. 2, three spacers 13 are used, as an example. When the torsion occurs at the damper portion 2, each of the spacers 13 serves to limit the torsion at the damper portion 2 when the spacer makes a contact with an end surface in the circumferential direction of the opening portion 15a corresponding to each. The side plates 11, 12 may be directly connected without the spacers 13.

The first set of rivets 14 are members for connecting the plate 10, the first side plate 11, the spacer 13, and the second side plate 12 together meaning retaining the aforementioned members integrally.

The center plate 15 is an annular and plate form member composing the damper portion 2, the hysteresis portion 3, and the limiter portion 4, arranged on the power transmission path from the damper portion 2 and the hysteresis portion 3 to the limiter portion 4. The center plate 15 includes, at a periphery portion thereof, multiple through-holes 15c (illustrated in FIG. 2 with the reference numeral 15a) for penetrating the second set of rivets 23. The center plate 15 is connected, or retained integrally, with the cover plate 21 thereat in the position of the through-holes 15c with the second set of rivets 23. As a result, the center plate 15 rotates together with the cover plate 21 as one unit. The center plate 15 includes notch portions 15b, which may be provided in forms of through-holes, at an outer periphery portion thereof, at circumferentially shifted positions from the portions connected with the second set of rivets 23, at positions corresponding to the positions of the first eat of bolts 8 viewed from the axial direction. The notch portions 15b correspond to the positions of notch portions 21c of the cover plate 21 viewed from the axial direction, and correspond to the positions of the first set of bolts 8 when the torsion has not occurred at the damper portion 2. The notch portions 15b is provided for the purpose of penetrating through the first set of bolts 8 and for a tool for bolting the first set of bolts 8 used thereat. The center plate 15 is formed to define a clearance between the cover plate 21 at the limiter portion 4, which is at a portion inward in the radial direction relative to where the center plate 15 and the cover plate 21 connect. The center plate 15 supports, or retains, an outer circumferential end portion of the second caned disc spring 22 at the limiter portion 4. The center plate 15, at the damper portion 2, includes the opening portions 15a for containing the coil springs 16 and the seating members 17. End surfaces in the circumferential direction of each opening portion 15a selectively contact the seating member 17 corresponding to each end surface. Each of the opening portions 15a is provided with a spacer 13 at an area outward in the radial direction relative to the damper portion 2. When the torsion occurs at the damper portion 2, the opening portion 15a serves to limit the torsion at the damper portion 2 when the spacer 13 makes the contact with the end surface in the circumferential direction of the opening portion 15a. The canter plate 15 is arranged between the first thrust member 18 and the second thrust member 19. The first thrust member 18 and the second thrust member 19 slidably supports at surfaces in the axial direction the center plate 15 at the hysteresis pardon 3 positioned inward in the radial direction relative to the damper portion 2. An inner circumferential end surface of the center plate 15 is rotationally supported to the hub member 26 via the first thrust member 18, or via the second thrust member 19 instead.

The coil springs 16 are component members of the damper portion 2. The coil springs 16 are contained in the opening portions 11a, 12a, 15a formed an the side plates 11, 12 and the center plate 15. Each of the coil springs 16 are in contact with the seating members 17 disposed at opposing ends of each coil spring 16. The coil springs 16 contract when the side plates 11, 12 and the center plate 15 make a relative rotation with each other and absorb the shock generated by the rotational difference between the side plates 11, 12 and the center plate 15. For the coil springs 16, springs having straight forms may be used. The spring having the straight form may be curved on an attachment process. Arc springs having curved forms in the circumferential direction from the start may be used for accommodating with more torsion.

The seating members 17 are component members of the damper portion 2. The seating members 17 are contained in the opening portions 11a, 12a, 15a formed on the side plates 11, 12 and the center plate 15. Each of the seating members 17 is disposed between the corresponding end surface in the circumferential direction of the opening portions 11a, 12a, 15a and the corresponding end of the coil spring 16. The seating members 17 may be formed using resin for reducing wearing of the coil springs 16.

The first thrust member 18 is an annular member composing the hysteresis portion 3, which is disposed between the first side plate 11 and the center plate 15. The first thrust member 18 is axially disposed between the first side plate 11 and the center plate 15. The first thrust member 18 engaged with the first side plate 11 is non-turnable and is movably supported in the axial direction with respect to the first side plate 11, and slidaby in a pressure contact state with the center plate 15. In the radial direction, the first thrust member 18 is disposed between the first side plate 11 and the hub member 20 for serving a purpose of a bearing, or a bush, for rotationally supporting the first side plate 11 to the hub member 28. In the radial direction, the first thrust member 18 is also disposed between the center plate 15 and the hub member 28 for serving a purpose of a bearing, or a bush, for rotationally supporting the center plate 15 to the hub member 28. The first thrust member 18 may be formed with resin for a cast reduction reason.

The second thrust member 19 is an annular member composing the hysteresis portion 3, which is disposed between the second side plate 12 and the center plate 15. The second thrust member 19 is axially disposed between the first coned disc spring 20 and the center plate 15. The second thrust member 19 engaged with the second side plate 12 and the first coned disc spring 20 is non-turnable and is movably supported in the axial direction with respect to the second side plate 12 and the first coned disc spring 20. The first coned disc spring 20 biases the second thrust member 19 in the direction of the center plate 15 so that the second thrust member 19 being slidable is in a pressure contact state with the center plate 15. In the radial direction, the second thrust member 19 is disposed between the second side plate 12 and the hub member 28 for serving a purpose of a bearing, or a bush, for rotationally supporting the second side plate 12 to the hub member 28. The second thrust member 19 may be formed with resin for a cast reduction purpose.

The first coned disc spring 20 is a dish form spring composing the hysteresis portion 3, disposed between the second thrust member 19 and the second side plate 12 for biasing the second thrust member 19 to the direction of the center plate 15.

The cover plate 21 is an annular member composing the limiter portion 4 for providing a cover for the limiter portion 4. The cover plate 21 is connected, or retained integrally, with the center plate 15 at an outer periphery portion with the second set of rivets 23. As a result, the cover plate 21 rotates together with the center plate 15 as one unit. The cover plate 21 includes the notch portions 21c, which may be provided in farms of through-holes, at an outer periphery portion thereof, at circumferentially shifted positions from the portions connected with the second set of rivets 23, at positions corresponding to the positions of the first set of bolts 8 viewed from the axial direction. The notch portions 21c correspond to the positions of the notch portions 15b of the center plate 15 viewed from the axial direction, and correspond to the positions of the first set of bolts 8 when the torsion has not occurred at the damper portion 2. The notch portions 21c are provided for the purpose of penetrating through the first set of bolts 8 and a tool for bolting the first set of bolts 8 to be used thereat. The cover plate 21 is formed to define a clearance between the center plate 15 at a circumferential portion it in the radial direction. The cover plate 21 includes a through-hole 21a for retaining the pressure plate 24 where the pressure plate 24 is non-turnable and is movably supported in the axial direction with respect to the cover plate 21. A protruding portion 24a of the pressure plate 24 is inserted to the through-hole 21a so that the pressure plate 24 is retained non-turnable with respect to the cover plate 21 and is movably supported in the axial direction with respect to the cover plate 21. The cover plate 21 includes multiple protruding portions 21b engaging with, through-holes 27a of the second friction materials 27 on the surface facing the second friction materials 27. The cover plate 21 retains the second friction materials 27 in a non-turnable state by the multiple protruding portions 21b engaging with the through-holes 27a of the second friction materials 27. The multiple protruding portions 21b may be press formed for the cost reduction purpose.

The second coned disc spring 22 is a dish formed spring composing the limiter portion 4, disposed between the center plate 15 and the pressure plate 24. The second coned disc spring 22 is retained by the center plate 15 at one end portion thereof (at an outer circumferential end portion in FIG. 1) and bias the pressure plate 24 in the direction of the cover plate 21 at another end portion thereof (at an inner circumferential end portion in FIG. 1).

The second set of rivets 25 are component members for connecting the center plate 15 and the cover plate 21 together, or in other words, for retaining them integrally.

The pressure plate 24 is an annular member composing the limiter portion 4 disposed between the second coned disc spring 22 and the first friction materials 26. The pressure plate 24 includes the protruding portion 24a for making the pressure plate 24 non-turnable and movably supported in the axial direction with respect to the cover plate 21. The protruding portion 24a being inserted to the through-hole 21a of the cover plate 21 is non-turnable and is movably supported in the axial direction with respect to the cover plate 21. The pressure plate 24 is biased with the second coned disc spring 22 in the direction of the first friction material 26. The pressure plate 24 includes different protruding portions 24b that engage with the through-holes 26a of the first friction materials 26 on the surface facing the first friction materials 26. The pressure plate 24 retains the first friction materials 26 in a non-turnable state by the different protruding portions 24b engaging with the through-holes 26a of the first friction materials 26. The different protruding portions 24b may be press formed for the cost reduction purpose.

The lining plate 25 is art annular member composing the limiter portion 4 disposed between the first friction materials 26 and the second friction materials 27, which are disposed between the cover plate 21 and the pressure plate 24. The lining plate 25 is connected, or retained integrally, at an inner periphery portion with a flange portion 26a of the hub member 28 with the third set of rivets 29. At an outer periphery portion, the lining plate 25 is disposed between the first friction materials 26 and the second friction materials 27, and slidably in a pressure contact state with the first friction materials 26 and the second friction materials 27. The lining plate 25 is disposed as a separate component on the power transmission path closer to the transmission relative to the portions configured to slip in the limiter portion 4 so as to implement countermeasures for the torque an a wavy road.

The first friction materials 26 are component members of the limiter portion 4 disposed between the lining plate 26 and the pressure plate 24. The first friction materials 26 are configured to form an annular form. The first friction materials 26 include multiple through-holes 26a for engaging with the different protruding portions 24b of the pressure plate 24. By the different protruding portions 24b engaging with the multiple through-holes 26a, the first friction materials 26 are retained to the pressure plate 24 in a non-turnable state with respect to the pressure plate 24. The first friction materials 26 are slidably in a pressure contact with the lining plate 25. The first friction materials 26 may be formed with rubber, resin, fiber (short-fiber or long-fiber), a material containing particles for conditioning friction coefficient $\mu$ or similar material.

The second friction materials 27 are component members of the limiter portion 4 disposed between the lining plate 25 and the cover plate 21. The second friction materials 27 are configured to form an annular form. The second friction materials 27 include the through-holes 27a for engaging with the multiple protruding portions 21b of the cover plate 21. By the multiple protruding portions 21b engaging with the through-holes 27a, the second friction materials 27 are retained to the cover plate 21 in a non-turnable state with respect to the cover plate 21. The second friction materials 27 are slidably in a pressure contact with the lining plate 25. The second friction materials 27 may be formed with rubber, resin, fiber (short-fiber or long-fiber), a materiel containing particles for conditioning friction coefficient $\mu$ or similar material.

The hub member 28 is a component member for outputting the rotational power from the limiter portion 4 to the transmission. The hub member 28 is in a tubular form at an inner periphery portion thereof and includes a flange portion 26a that extend outward in the radial direction from a portion in the direction of the transmission (to a right in FIG. 1) of the aforementioned tubular portion. The hub member 28 engages with the input shaft 30 of the transmission at the inner peripheral surface of the tubular portion with splines, so that the hub member 28 is non-turnable and is movable in the axial direction thereat. The hub member 28 rotationally supports the first side plate 11 and the center plate 15 at the outer periphery surface via the first thrust member 18 and rotationally supports the second side plate 12 via the second thrust member 19. The aforementioned tubular portion of the hub member 28 is disposed at the inner periphery portion oil the center plate 15 for an advantage of restraining the size oil the device. The flange portion 28a is connected, or retained integrally, at an outer periphery portion with the lining plate 25 with the third set of rivets 29. As a result, the hub member 28 rotates together with the lining plate 25 as one unit.

The third set of rivets 23 are component members for connecting the lining plate 25 and the flange portion 28a at the hub member 28 together, or in other words, for retaining them integrally.

According to the first embodiment, a connection from the flywheel 7 to the damper portion 2 is arranged at a portion outward in the radial direction with respect to the damper portion 2, so that a distribution balance of the inertias for the device may be improved with a simple structure and reduced cost. The first embodiment avoids the size of the device to increase compared to when the connection from the flywheel 7 to the damper portion 2 is arranged at a portion inward in the radial direction with respect to the damper portion 2 (at a portion serving as a hub member conventionally), which results in increasing the device size due to the damper portion 2 being arranged at a portion more outward in the radial direction or the limiter portion being arranged at a portion more outward in the radial direction or more in the axial direction. With the first embodiment the attachment member (the plate 10) to the flywheel 7 is configured with small amount of bending, which is also advantageous in restraining the size of the device to increase. The first embodiment adopts a wide range of elemented torque fluctuation absorber technologies so that an engineering effort is reduced.

Figure 3:
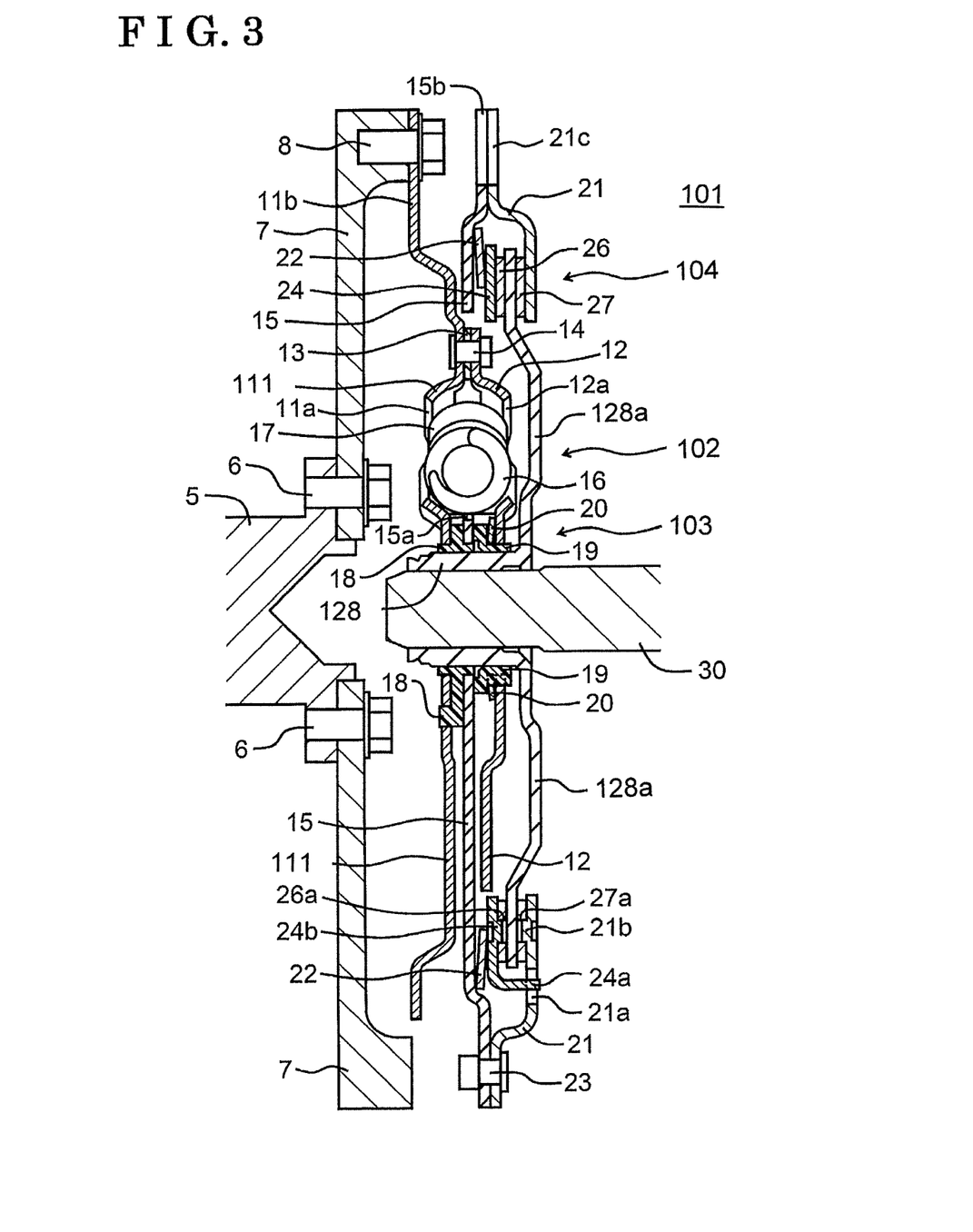
FIG. 3 is a cross-sectional view illustrating a typical configuration of the torque fluctuation absorber according to a second embodiment.

A second embodiment of the torque fluctuation absorber 101 having a damper portion 102, a hysteresis portion 103 and a limiter portion 104 will be described as follows referring to the drawings. FIG. 3 is a cross-sectional view illustrating a typical configuration of the torque fluctuation absorber according to the second embodiment.

The second embodiment is an alteration of the first embodiment. Aside from integrating the first side plate 11 (shown in FIG. 1 with the reference numeral 11) with the plate 10 (shown in FIG. 1 with the reference numeral 10) of the first embodiment to form the first side plate 111 and integrating the flange portion 28a (shown in FIG. 1 with the reference numeral 28a) of the hub member 28 with the lining plate 25 (shown in FIG. 1 with the reference numeral 25) of the first embodiment to form the flange portion 128a, the configuration of the second embodiment is similar to the configuration of the first embodiment.

The first side plate 111 includes an extended portion 11b, which extends outward in the radial direction from the portion being connected together, or retained integrally, with the spacer 13 and the second side plate 12 by the first set of rivets 14. The extended portion 11b is configured to divert the center plate 15 of the limiter portion 4 and connects, or attaches and is fixed, to the flywheel 7 with the first set of bolts 8 at the outer peripheral portion thereof. Aside from the above mentioned configurations, the first side plate 111 is similar to the first side plate 11 (shown in FIG. 1 with the reference numeral 11) of the first embodiment.

The hub member 128 is in a tubular form at an inner periphery portion thereof and includes the flange portion 128a that extends outward in the radial direction from the portion in the direction of the transmission (to a right in FIG. 1) of the aforementioned tubular portion. The flange portion 128a extends to the position between the first friction materials 26 and the second friction materials 27, which are disposed between the cover plate 21 and the pressure plate 24. The outer periphery portion of the flange portion 128a is disposed between the first friction materials 26 and the second friction materials 27, and is slidable in a pressure contact state with the first friction materials 26 and the second friction materials 27. Aside from the above mentioned configurations, the hub member 128 is similar to the hub member 28 (shown in FIG. 1 with the reference numeral 28) of the first embodiment.

In addition to the advantages similar to the first embodiment, the second embodiment is advantageous in reducing a number of parts and costs compared to the first embodiment.

Figure 4:
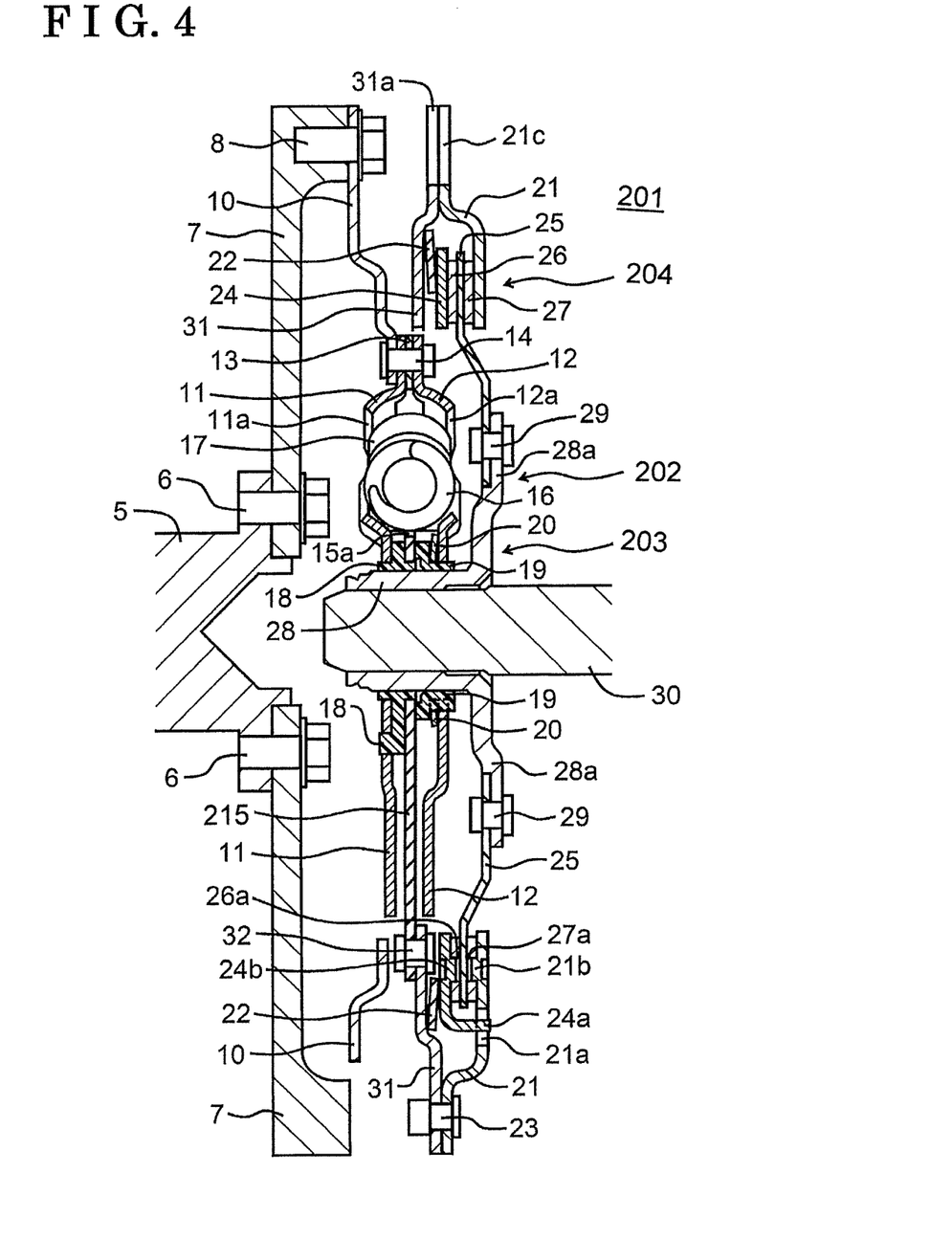
FIG. 4 is a cross-sectional view illustrating a typical configuration of the torque fluctuation absorber according to a third embodiment.

A third embodiment of the torque fluctuation absorber 201 will be described as follows referring to the drawings. FIG. 4 is a cross-sectional view illustrating a typical configuration of the torque fluctuation absorber according to a third embodiment.

The third embodiment is an alteration of the first embodiment. Aside from separating the center plate 15 (shown in FIG. 1 with the reference numeral 15) of the first embodiment to the center plate 215 and a support plate 31 and connecting the center plate 215 and the support plate 31 with a fourth set of rivets 32, the configuration of the third embodiment is similar to the configuration of the first embodiment.

The center plate 215 is an annular and plate form member composing the damper portion 202 and the hysteresis portion 203, arranged on the power transmission path from the damper portion 202 and the hysteresis portion 203 to the limiter portion 204. The center plate 215 is connected, or retained integrally, to the support plate 31 at the outer periphery portion thereof with the fourth set of rivets 32. The configurations of the center plate 215 at an inward in the radial direction with respect to the fourth set of rivets 32 is similar to those of the center plate 15 (shown in FIG. 1 with the reference numeral 15) of the first embodiment.

The support plate 31 is an annular member composing the limiter portion 204, which supports, or retains, the outer circumferential end portion of the second coned disc spring 22. At an outer periphery portion, the support plate 31 is connected together, or retained integrally, to the cover plate 21 with the second set of rivets 23. As a result, the support plate 31 rotates together with the cover plate 21 as one unit. The support plate 31 includes notch portions 31a, which may be provided in forms of through-holes, at an outer periphery portion thereof, at circumferentially shifted positions from the portions connected with the second set of rivets 23, at positions corresponding to the positions of the first set of bolts 8 viewed from the axial direction. The notch portions 31a correspond to the positions of notch portions 21c of the cover plate 21 viewed from the axial direction, and correspond to the positions of the first set of bolts 8 when the torsion has not occurred at the damper portion 202. The notch portions 31a are provided for the purpose of penetrating through the first set of bolts 8 and the tool for bolting the first set of bolts 8 to be used thereat. The support plate 31 is formed to define a clearance between the cover plate 21 at the limiter portion 204, which is at a portion inward in the radial direction relative to where the support plate 31 and the cover plate 21 connect. The support plate 31 supports, or retains, the outer circumferential end portion of the second coned disc spring 22 at the limiter portion 204. At an inner periphery portion, the support plate 31 is connected together, or retained integrally, to the center plate 215 with the fourth set of rivets 32. As a result, the support plate 31 rotates together with the center plate 215 as one unit.

The fourth set of rivets 32 are component members for connecting the center plate 215 and the support plate 31 together, or in other words, for retaining them integrally.

The third embodiment is similarly advantageous to the first embodiment.

Figure 5:
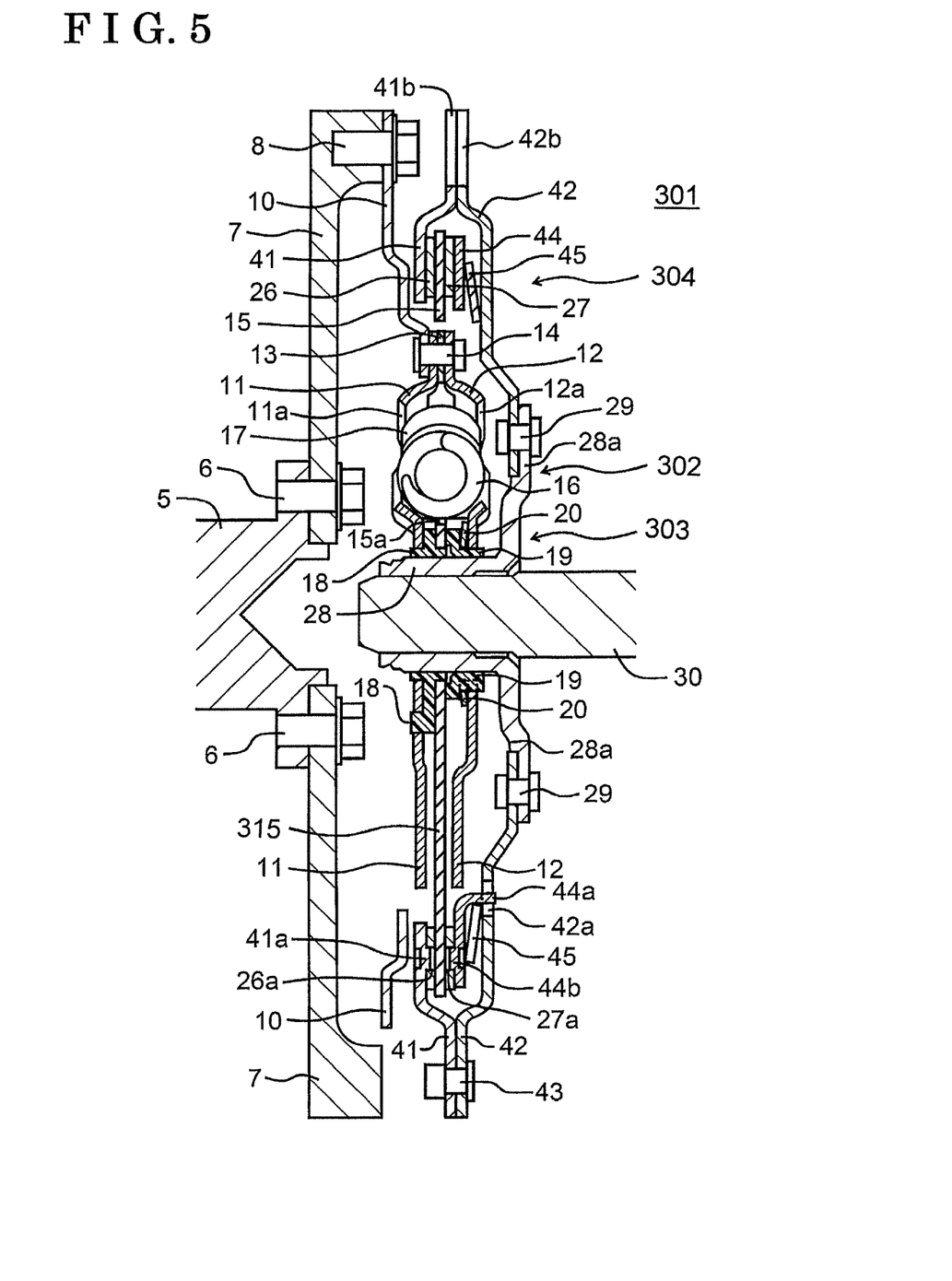
FIG. 5 is a cross-sectional view illustrating a typical configuration of the torque fluctuation absorber according to a fourth embodiment.

A fourth embodiment of the torque fluctuation absorber 301 will be described as follows referring to the drawings. FIG. 5 is a cross-sectional view illustrating a typical configuration of the torque fluctuation absorber according to a fourth embodiment.

The fourth embodiment is an alteration of the first embodiment. With the first embodiment, a component member configured to slip with respect to the first friction materials 26 and the second friction materials 27 at the limiter portion 4, which is arranged on the power transmission path from the center plate 15 to the flange portion 28a of the hub member 28, is the component member provided on the power transmission path closer to the transmission, which is the lining plate 25 in FIG. 1. Instead, with the fourth embodiment, the component member configured to slip with respect to the first friction materials 26 and the second friction materials 27 at the limiter portion 304 is a component member provided on the aforementioned power transmission path closer to the engine, which is the center plate 315. Aside from the configuration difference described above, the fourth embodiment is similar to the configuration of the first embodiment.

The center plate 315 is an annular and plate form member composing the damper portion 302, the hysteresis portion 303, and the limiter portion 304, arranged on the power transmission path from the damper portion 302 and the hysteresis portion 303 to the limiter portion 304. The center plate 315 serves the function of the lining plate 25 at the limiter portion 304. At the outer periphery portion, the center plate 315 is disposed between the first friction materials 26 and the second friction materials 27, which are disposed between a cover plate 41 and a pressure plate 44, and slidably in a pressure contact state with the first friction materials 26 and the second friction materials 27. The configurations of the center plate 315 at an inward in the radial direction with respect to the portion where the first friction materials 26 and the second friction materials 27 are in the pressure contact state is similar to those of the center plate 15 (shown in FIG. 1 with the reference numeral 15) of the first embodiment.

The cover plate 41 is an annular member composing the limiter portion 304 for providing a cover for the limiter portion 304. The cover plate 41 is connected together, or retained integrally, to a support plate 42 at an outer periphery portion with a fifth set of rivets 43. As a result, the cover plate 41 rotates together with the support plate 42 as one unit. The cover plate 41 includes notch portions 41b, which may be provided in forms of through-holes, at an outer periphery portion thereof, at circumferentially shifted positions from the portions connected with the fifth set of rivets 43, at positions corresponding to the positions of the first set of bolts 8 viewed from the axial direction. The notch portions 41b correspond to the positions of notch portions 42b of the support plate 42 viewed from the axial direction. The notch portions 41b are provided for the purpose of penetrating through the first set of bolts 8 and the tool for bolting the first set of bolts 8 to be used thereat. The cover plate 41 is formed to define a clearance between the support plate 42 at a circumferential portion inward in the radial direction. The cover plate 41 includes multiple protruding portions 41a engaging with the through-holes 26a of the first friction materials 26 on the surface facing the first friction materials 26. The cover plate 41 retains the first friction materials 26 in a non-turnable state by the multiple protruding portions 41a engaging with the through-holes 26a of the first friction materials 26. The multiple protruding portions 41a may be press formed for the cost reduction purpose. The cover plate 41 is formed not to touch the plate 10.

The support plate 42 is an annular member composing the limiter portion 304, which supports, or retains, the inner circumferential end portion of the a third coned disc spring 45. At an outer periphery portion, the support plate 42 is connected together, or retained integrally, to the cover plate 41 with the fifth set of rivets 43. As a result, the support plate 42 rotates together with the cover plate 41 as one unit. The support plate 42 includes the notch portions 42b, which may be provided in forms of through-holes, at an outer periphery portion thereof, at circumferentially shifted positions from the portions connected with the fifth set of rivets 43, at positions corresponding to the positions of the first set of bolts 8 viewed from the axial direction. The notch portions 42b correspond to the positions of notch portions 41b of the cover plate 41 viewed from the axial direction. The notch portions 42b are provided for the purpose of penetrating through the first set of bolts 8 and the tool for bolting the first set of bolts 8 to be used thereat. The support plate 42 is formed to define a clearance between the cover plate 41 at the limiter portion 304, which is at a portion inward in the radial direction relative to where the support plate 42 and the cover plate 41 connect. The support plate 42 supports, or retains, the inner circumferential end portion of the third coned disc spring 45 at the limiter portion 304. At a middle portion thereof, the support plate 42 includes a through-hole 42a for retaining the pressure plate 44 where the pressure plate 44 is non-turnable and is movably supported in the axial direction with respect to the support plate 42. A protruding portion 44a of the pressure plate 44 is inserted to the through-hole 42a so that the pressure plate 44 is retained non-turnable with respect to the support plate 42 and is movably supported in the axial direction with respect to the support plate 42. At an inner periphery portion, the support plate 42 is connected together, or retained integrally, to the flange portion 28a of the hub member 28 with the third set of rivets 29. As a result, the support plate 42 rotates together with the hub member 28 as one unit.

The fifth set of rivets 43 are component members for connecting the over plate 41 and the support plate 42 together, or in other words, for retaining them integrally.

The pressure plate 44 is an annular member composing the limiter portion 304 disposed between the third coned disc spring 45 and the second friction materials 27. The pressure plate 44 includes the protruding portion 44a for the pressure plate 44 to be retained to the support plate 42 where the pressure plate 44 is non-turnable and is movably supported in the axial direction with respect to the support plate 42. The protruding portion 44a being inserted to the through-hole 42a of the support plate 42 is non-turnable and is movably supported in the axial direction with respect to the support plate 42. The pressure plate 44 is biased with the third coned disc spring 45 in the direction of the second friction material 27. The pressure plate 44 includes different protruding portions 44b that engage with the through-holes 27a of the second friction materials 27 on the surface facing the second friction materials 27. The pressure plate 44 retains the second friction materials 27 in a non-turnable state by the different protruding portions 44b engaging with the through-holes 27a of the second friction materials 27. The different protruding portions 44b may be press formed for the cost reduction purpose.

The third coned disc spring 45 is a dish formed spring composing the limiter portion 304, disposed between the support plate 42 and the pressure plate 44. The third coned disc spring 45 is retained by the support plate 42 at one end portion thereof (at an inner circumferential end portion in FIG. 5) and bias the pressure plate 44 in the direction of the cover plate 41 at another end portion thereof (at an outer circumferential end portion in FIG. 5).

The fourth embodiment is similarly advantageous to first embodiment.

According to an aspect of the disclosure, the torque fluctuation absorber 1 includes the damper portion 2 arranged on the power transmission path from the crankshaft 5 of the power source to the input shaft 30 of the transmission, absorbing the torque fluctuation between the crankshaft 5 and the input shaft 30 with an elasticity thereof, and the limiter portion 4 arranged on the power transmission path from the damper portion 2 to the input shaft 30, configured to slip when the torque fluctuation caused by the torsion between the crankshaft 5 and the input shaft 30 equals or exceeds the predetermined torque defined to absorb of the damper portion 2. The damper portion 2 includes the center plate 15 in annular form transmitting the rotational power to the limiter portion 4, the side plates 11, 12, each in the annular form, arranged at each opposite side of the center plate 15 in the axial direction with the displacement, receiving the input of the rotational power from the crankshaft 5, the coil springs 15 absorbing the torque fluctuation caused by the torsion between the center plate 15 and the side plates 11, 12. The side plates 11, 12 directly or indirectly connect to the flywheel 7 that connects to the crankshaft 5 at the circumferential portion outward in the radial direction with respect to the damper portion 2.

The torque fluctuation absorber 1 with the above characteristic connects the torque fluctuation absorber 1 to the flywheel 7 at the circumferential portion outward in the radial direction with respect to the damper portion 2, so that the balance of the inertias is improved with the simple structure and reduced cost.

According to another aspect of the disclosure, the center plate 15 connects to the component provided on the power transmission path closer to the power source relative to surfaces configured to slip in the limiter portion 4.

The torque fluctuation absorber 1 with the above characteristic improves the balance of the inertias with a simple structure and at a reduced cost.

According to further aspect of the disclosure, the center plate 15 is a first component provided on the power transmission path closer to the power source relative to the surfaces configured to slip in the limiter portion 4.

The torque fluctuation absorber 1 with the above characteristic improves the balance of the inertias with a simple structure and at the reduced cost.

According to another aspect of the disclosure, the torque fluctuation absorber 1 further includes the hub member 28 transmitting the rotational power to the input shaft 30. The hub member 28 connects to the component provided on the power transmission path closer to the transmission relative to the surfaces configured to slip in the limiter portion 4.

The torque fluctuation absorber 1 with the above characteristic improves the balance of the inertias with a simple structure and at the reduced cost.

According to further aspect of the disclosure, the torque fluctuation absorber 1 includes the hub member 28 transmitting the rotational power to the input shaft 34. The hub member 28 is a first component provided on the power transmission path closer to the transmission relative to the surfaces configured to slip in the limiter portion 4.

The torque fluctuation absorber 1 with the above characteristic improves the balance of the inertias with a simple structure and at the reduced cost.

According to another aspect of the disclosure, the first component provided on the power transmission path closer to the transmission relative to the surfaces configured to slip in the limiter portion 4 is sandwiched between the cover plate 21 and the pressure plate 24 provided an the power transmission path closer to the power source relative to the surfaces configured to slip in the limiter portion 4.

The torque fluctuation absorber 1 with the above characteristic improves the balance of the inertias with a simple structure and at the reduced cost.

According to further aspect of the disclosure, the first component provided on the power transmission path closer to the power source relative to the surfaces configured to slip in the limiter portion 4 is sandwiched between the members provided on the power transmission path closer to the transmission relative to the surfaces configured to slip in the limiter portion 4.

The torque fluctuation absorber 1 with the above characteristic improves the balance of the inertias with a simple structure and at the reduced cost.

According to another aspect of the disclosure, the torque fluctuation absorber 1 connects to the flywheel 7 with a plurality of bolts 8 from the direction of the transmission. The subset of parts composing the limiter portion 4 are provided with the notch portions 15b, 21c, 31a, 41b, 42b or the through-holes for the bolts 8 to penetrate at the positions corresponding to the positions of the bolts 8 viewed from the axial direction.

The torque fluctuation absorber 1 with the above characteristic improves the balance of the inertias with a simple structure and at the reduced cost.

According to further aspect of the disclosure, the hub member 28 is arranged at the position inward in the radial direction with respect to the inner peripheries of the center plate 15 and each of the site plates 11, 12.

The torque fluctuation absorber 1 with the above characteristic improves the balance of the inertias with a simple structure and at the reduced cost.

According to another aspect of the disclosure, the torque fluctuation absorber 1 further includes the first thrust member 18 arranged between the center plate 15 and the hub member 28 in the radial direction, rotationally supporting the center plate 15 to the hub member 28.

The torque fluctuation absorber 1 with the above characteristic improves the balance of the inertias with a simple structure and at the reduced cost.

According to further aspect of the disclosure, the torque fluctuation absorber 1 further includes the hysteresis portion 3 arranged in the parallel position on the power transmission path relative to the damper portion 2, absorbing the torque fluctuation between the crankshaft 5 and the input shaft 30 with the hysteresis torque. The hysteresis portion 3 includes the first thrust member 18 and the second thrust member 19 sandwiching the center plate 15 from each opposite side in the axial direction. One of the thrust members 18, 19 serves the purpose of the first thrust member 18.

The torque fluctuation absorber 1 with the above characteristic improves the balance of the inertias with a simple structure and at the reduced cost.

According to another aspect of the disclosure, the torque fluctuation absorber 1 further includes the plate 10 in an annular form. The side plates 11, 12 connect indirectly to the flywheel 7 via the plate 10.

The torque fluctuation absorber 1 with the above characteristic improves the balance of the inertias with a simple structure and at the reduced cost.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, if is expressly intended that all such variations, changes and equivalents which fall within the spirit and scope of the present invention as defined in the claims, be embraced thereby.

The invention claimed is:

1. A torque fluctuation absorber, comprising:
  a damper portion arranged on a power transmission path from an output shaft of a power source to an input shaft of a transmission, absorbing a torque fluctuation between the output shaft and the input shaft with an elasticity thereof; and
  a limiter portion arranged on the power transmission path from the damper portion to the input shaft, configured to slip when the torque fluctuation caused by a torsion between the output shaft and the input shaft equals or exceeds a predetermined torque defined to absorb at the damper portion; wherein the damper portion includes a center plate in annular form transmitting a rotational power to the limiter portion;

side plates, each in an annular form, arranged at each opposite side of the center plate in an axial direction with a displacement, receiving the input of the rotational power from the output shaft;

an elastic member absorbing the torque fluctuation caused by the torsion between the center plate and the side plates; wherein the side plates directly or indirectly connect to a flywheel that connects to the output shaft at a circumferential portion outward in a radial direction with respect to the damper portion; wherein the torque fluctuation absorber connects to the flywheel with a plurality of bolts from a direction of the transmission; and wherein a subset of parts composing the limiter portion are provided with notch portions or through-holes for the bolts to penetrate at positions corresponding to the positions of the bolts viewed from the axial direction.

2. The torque fluctuation absorber according to claim 1 wherein, the center plate connects to a component provided on the power transmission path closer to the power source relative to surfaces configured to slip in the limiter portion.

3. The torque fluctuation absorber according to claim 1 wherein, the center plate is a first component provided on the power transmission path closer to the power source relative to surfaces configured to slip in the limiter portion.

4. The torque fluctuation absorber according to claim 1 further comprising:

an output member transmitting the rotational power to the input shaft; wherein, the output member connects to a component provided on the power transmission path closer to the transmission relative to surfaces configured to slip in the limiter portion.

5. The torque fluctuation absorber according to claim 4 wherein, the output member is arranged at a position inward in the radial direction with respect to inner peripheries of the center plate and each of the side plates.

6. The torque fluctuation absorber according to claim 5 further comprising:

a bearing portion arranged between the center plate and the output member in the radial direction, rotationally supporting the center plate to the output member.

7. The torque fluctuation absorber according to claim 6 further comprising:

a hysteresis portion arranged in a parallel position on the power transmission path relative to the damper portion, absorbing the torque fluctuation between the output shaft and the input shaft with a hysteresis torque; wherein, the hysteresis portion includes a pair of thrust members sandwiching the center plate from each opposite side in the axial direction; and wherein one of the pair of thrust members serves as the bearing portion.

8. The torque fluctuation absorber according to claim 1 further comprising:

the output member transmitting the rotational power to the input shaft; wherein, the output member is a first component provided on the power transmission path closer to the transmission relative to surfaces configured to slip in the limiter portion.

9. The torque fluctuation absorber according to claim 8 wherein, the first component provided on the power transmission path closer to the transmission relative to the surfaces configured to slip in the limiter portion is sandwiched between members provided on the power transmission path closer to the power source relative to the surfaces configured to slip in the limiter portion.

10. The torque fluctuation absorber according to claim 8 wherein, the first component provided on the power transmission path closer to the power source relative to the surfaces configured to slip in the limiter portion is sandwiched between members provided on the power transmission path closer to the transmission relative to the surfaces configured to slip in the limiter portion.

11. The torque fluctuation absorber according to claim 1 further comprising:

a connection plate in an annular form; wherein, the side plates connect indirectly to the flywheel via the connection plate.

12. A torque fluctuation absorber, comprising:

a damper portion arranged on a power transmission path from an output shaft of a power source to an input shaft of a transmission, absorbing a torque fluctuation between the output shaft and the input shaft with an elasticity thereof;

a limiter portion arranged on the power transmission path from the damper portion to the input shaft, configured to slip when the torque fluctuation caused by a torsion between the output shaft and the input shaft equals or exceeds a predetermined torque defined to absorb at the damper portion;

an output member transmitting the rotational power to the input shaft; and a hysteresis portion arranged in a parallel position on the power transmission path relative to the damper portion, absorbing the torque fluctuation between the output shaft and the input shaft with a hysteresis torque; wherein the damper portion includes a center plate in annular form transmitting a rotational power to the limiter portion;

side plates, each in an annular form, arranged at each opposite side of the center plate in an axial direction with a displacement, receiving the input of the rotational power from the output shaft;

an elastic member absorbing the torque fluctuation caused by the torsion between the center plate and the side plates; wherein the side plates directly or indirectly connect to a flywheel that connects to the output shaft at a circumferential portion outward in a radial direction with respect to the damper portion; wherein the output member connects to a component provided on the power transmission path closer to the transmission relative to surfaces configured to slip in the limiter portion; wherein the output member is arranged at a position inward in the radial direction with respect to inner peripheries of the center plate and each of the side plates; wherein a bearing portion is arranged between the center plate and the output member in the radial direction, rotationally supporting the center plate to the output member; wherein the hysteresis portion includes a pair of thrust members sandwiching the center plate from each opposite side in the axial direction; and wherein one of the pair of thrust members serves as the bearing portion.

13. A torque fluctuation absorber, comprising:

a damper portion arranged on a power transmission path from an output shaft of a power source to an input shaft of a transmission, absorbing a torque fluctuation between the output shaft and the input shaft with an elasticity thereof; and a limiter portion arranged on the power transmission path from the damper portion to the input shaft, configured to slip when the torque fluctuation caused by a torsion between the output shaft and the input shaft equals or exceeds a predetermined torque defined to absorb at the damper portion; wherein the damper portion includes a center plate in annular form transmitting a rotational power to the limiter portion;

side plates, each in an annular form, arranged at each opposite side of the center plate in an axial direction with a displacement, receiving the input of the rotational power from the output shaft;

an elastic member absorbing the torque fluctuation caused by the torsion between the center plate and the side plates; wherein the side plates directly or indirectly connect to a flywheel that connects to the output shaft at a circumferential portion outward in a radial direction with respect to the damper portion;

the limiter portion is arranged at a position outward in the radial direction relative to the damper portion;

the torque fluctuation absorber connects to the flywheel with a plurality of bolts from a direction of the transmission; and a subset of parts composing the limiter portion are provided with notch portions or through-holes for the bolts to penetrate at positions corresponding to the positions of the bolts viewed from the axial direction.

* * * * *